United States Patent Office 3,565,922
Patented Feb. 23, 1971

3,565,922
TRIFUNCTIONAL EPOXY CROSSLINKING AGENTS
Thomas P. Rudy, Saratoga, and Toshio W. Nakagawa, San Jose, Calif., assignors to United Aircraft Corporation, East Hartford, Conn., a corporation of Delaware
No Drawing. Filed Sept. 2, 1966, Ser. No. 576,809
Int. Cl. C07d 1/22
U.S. Cl. 260—348
2 Claims

ABSTRACT OF THE DISCLOSURE

This invention relates to novel trifunctional epoxy compounds and to the use of such compounds as crosslinking agents for carboxy-terminated polyolefin polymers. The trifunctional epoxides are diesters of 4,5-epoxycyclohexane-1,2-dicarboxylic acid and lower alkyl derivatives thereof having the following general structural formula:

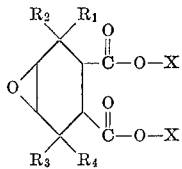

wherein $R_1$, $R_2$, $R_3$, and $R_4$ are hydrogen or lower alkyl groups and X is moiety containing up to 11 carbon atoms selected from the group consisting of epoxycyclohexyl and acyclic epoxyaliphatic moieties having the following structural formulas:

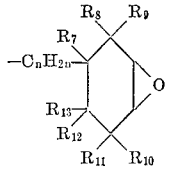

or

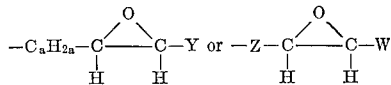

wherein $R_7$ through $R_{13}$ are hydrogen or lower alkyl groups, $n$ is an integer from 1 to 5, $a$ is an integer from 1 to 9, Y is either a hydrogen atom or an aliphatic group containing $b$ carbon atoms wherein $a+b=\leq 9$; Z is a branched chain aliphatic group containing $c$ carbon atoms and W is either hydrogen or an aliphatic group containing $d$ carbon atoms wherein $c$ is an integer from 2 through 9 and $c+d\leq 9$.

BACKGROUND OF THE INVENTION

Carboxy-terminated polymers such as are described in copending patent applications, Ser. No. 554,966 filed June 2, 1966 and Ser. No. 357,147 filed Apr. 3, 1964, and now abandoned, are extremely useful as binders for castable composite solid propellants. In connection with such use, epoxides and polyfunctional aziridines have been employed to crosslink the polymers. While it is generally agreed that an all-epoxy cure system should be superior to the aziridinyl cure systems in terms of thermal and hydrolytic stability, attempts to obtain satisfactory all-epoxy cures with such carboxy-terminated polymers have been unsuccessful.

The readily available polyfunctional epoxides employed were found to be incompatible with the highly solid loaded polymers used to fabricate propellant grains and attempts to process the loaded polymers were completely unsuccessful.

According to this invention, however, novel trifunctional epoxides have been synthesized which have been found to be crosslinking agents for liquid carboxy-terminated polyolefin polymers and produce processable mixes with such liquid polymers containing a high solid loading of particulate oxidizers, metals, combustion rate modifiers, and other components employed in the fabrication of cast solid propellant grains.

DESCRIPTION OF THE INVENTION

The trifunctional epoxides according to this invention are diesters of 4,5 epoxycyclohexane-1,2-dicarboxylic acid and lower alkyl derivatives thereof having the following general structural formula:

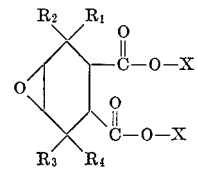

wherein $R_1$, $R_2$, $R_3$, and $R_4$ represent members selected from the group consisting of a hydrogen atom and lower alkyl groups and X is group containing up to 11 carbon atoms having the following general structure:

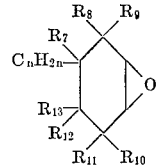

or

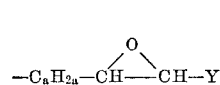

or

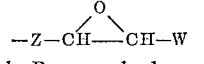

wherein $R_7$ through $R_{13}$ are hydrogen atoms or lower alkyl groups, $n$ is an integer from 1 to 5, $a$ is an integer from 1 to 9, Y is either a hydrogen atom or an aliphatic group containing $b$ carbon atoms wherein $a+b\leq 9$; Z is a branched chain aliphatic group containing $c$ carbon atoms and W is either a hydrogen atom or an aliphatic group containing $d$ carbon atoms wherein $c$ is an integer from 2 through 9 and wherein $c+d\leq 9$.

The compounds of this invention may be prepared by esterification of a singly unsaturated dicarboxylic acid with a singly unsaturated alcohol to produce a triply unsaturated diester, followed by epoxidation of the diester. Suitably epoxidizing agents include peroxy-carboxylic acids such as peracetic acid and perbenzoic acid.

The reaction is illustrated by the following reaction scheme wherein tetrahydrophthalic acid in the form of the cyclic anhydride is the starting material:

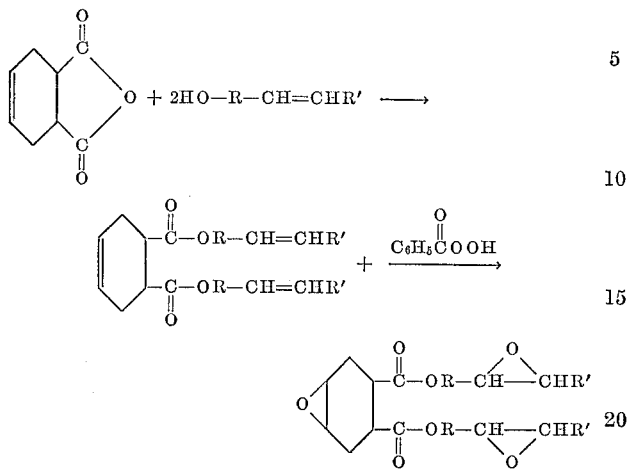

wherein R and R' are straight or branched chain hydrocarbyl groups which may be linked into a ring structure and R' may also be a hydrogen atom. The total number of carbon atoms in the alcohol should be no greater than 11 since higher carbon content causes the viscosity of the propellant system to be cured by these compounds to increase beyond the point where the binder-solids mix can be readily processed. Suitable cure catalysts for the cross-linking agents of this invention include chelates and carboxylates of certain transition metals such as, for example, zirconium acetylacetonate and chromium 2-ethylhexanoate.

EXAMPLE 1

Preparation of bis(3,4 epoxycyclohexylmethyl)-4,5 epoxycyclohexane-1,2-dicarboxylate

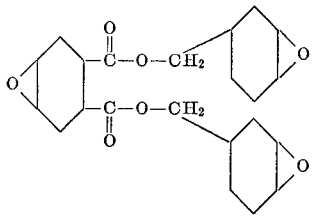

56 grams of tetrahydrobenzyl alcohol, 76 g. of tetrahydrophthalic anhydride and 1 g. of trifluoroacetic acid in chloroform solvent were refluxed for several hours. The reaction mixture was cooled to 10° C. and 100 g. of trifluoroacetic anhydride was slowly added to the reaction mixture. 56 g. of tetrahydrobenzyl alcohol was added dropwise while the reaction temperature was held to less than 20° C. with an ice bath. The reactants were stirred for an additional hour after all of the alcohol had been added. The reaction product was repeatedly extracted with saturated aqueous bicarbonate solution. The solution of the product was dried over sodium sulphate, then stripped of solvent on a rotary evaporator and finally on a molecular still (wall temperature 75° C., pressure 50–100 microns).

The triply unsaturated diester produced according to the above procedure was epoxidized with perbenzoic acid prepared according to the procedures in Gilman & Blatt, "Organic Synthesis" Collective Volume 1, p. 431. 3.78 g. of the triply unsaturated diester was reacted with 45.6 g. of perbenzoic acid at 0° C. in chloroform solvent. The perbenzoic acid was handled in chloroform solvent and added in increments to the diester in the synthesis. The reaction mixture was maintained at 0° C. and allowed to react overnight after which 96% of the theoretical amount of perbenzoic acid was found to have reacted.

The reaction product was repeatedly washed with saturated aqueous bicarbonate solution and dried over sodium sulphate. The solvent was stripped on a rotary evaporator and the product further cleaned on a molecular still. The product had an epoxy equivalent of 148 g./equivalent, a molecular weight of 408 g./mole and a functionality of 2.76 as compared to the respective theoretical values of bis(3,4 epoxycyclohexylmethyl) - 4,5 - epoxycyclohexane-1,2-dicarboxylate, hereinafter referred to as ECD, of 135 g./equivalent, 406 g./mole and functionality of 3.

EXAMPLE 2

Preparation of bis(10,11-epoxyundecyl)-4,5-epoxycyclohexane-1,2-dicarboxylate

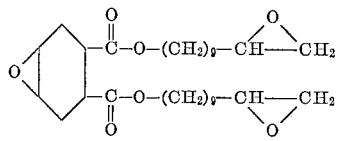

A process analagous to that described in Example 1 was employed whereby a triply unsaturated diester was formed by reaction of 10-undecenol-1 and tetrahydrophthalic anhydride and the diester so formed was epoxidized with perbenzoic acid. In the recovery and purifying of the intermediate diester and the final product, emulsions formed in the final washing steps with the aqueous bicarbonate. With respect to the diester a solution of the diester in benzene solvent was dried overnight over sodium sulfate, stripped of solvent on a rotary evaporator and passed through a molecular still at a wall temperature of 165° C. and 100 micron pressure.

This produced a milky white nonvolatile product having an IR spectrum consistent with the desired triply unsaturated diester, bis(10-undecenyl) - 4 - cyclohexene-1,2-dicarboxylate. In recovering the epoxidized product, a turbid chloroform solution of the product was obtained after drying over sodium sulphate. This solution was filtered through a celite bed, stripped of solvent and passed through a molecular still at 100° C. wall temperature and 100 micron pressure. The product had an epoxy equivalent weight of 214 g./equivalent and a molecular weight of 508 g./mole. The infrared spectrum of the product showed the complete disappearance of unsaturation bands at 6.1 and 11 microns and the remaining bands were consistent with the structure of the desired product, bis(10,11-epoxyundecyl)-4,5-epoxycyclohexane - 1,2 - dicarboxylate, hereinafter referred to as EUD.

EXAMPLE 3

Preparation of bis(5,6-epoxyhexyl-2)-4,5-epoxycyclohexane-1,2-dicarboxylate

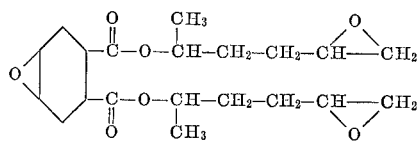

50 g. of 5-hexenol-2, 76 g. of tetrahydrophthalic anhydride and 1 g. p-toluenesulfonic acid in 100 ml. of chloroform solvent were heated for 4 hous at 95° C. 126 g. of trifluoroacetic anhydride was added and the temperature was maintained at 5–10° C. during the addition. 60 g. of 5-hexenol-2 was added dropwise to the reaction mixture which was maintained at 20° C., a slight exotherm being noted. The reactants were stirred for 1.5 hours after addition was completed, the mixture was washed with water, one percent aqueous sodium hydroxide solution, and finally with an aqueous saturated salt solution until neutral. Solvent was evaporated and the product stripped on a molecular still, wall temperature 75°, 30 micron pressure. The product, bis(5-hexenyl-2)-4-cyclohexene-1,2 dicarboxylate was epoxidized with perbenzoic acid and recovered in a manner analagous to that described in Example 1. The product had an epoxy equivalent weight 151 g./equivalent, a molecular weight of 417 g./mole and functionality of 2.8. The infrared spectrum was consistent with the structure of the desired product bis(5,6-epoxyhexyl-2)-4,5-epoxycyclohexane-1,2-dicarboxylate, hereinafter referred to as EHD.

The compounds prepared according to the processes of Examples 1–3 were used to crosslink the binder of a propellant mix comprising 16% by weight of a plasticized liquid carboxy-terminated polyisobutylene having a molecular weight of about 1700 and functionality of 1.8, 68% by weight of finely divided ammonium perchlorate and 16% by weight of finely divided aluminum. A suitable cure catalyst was included in the carboxy-terminated polyisobutylene. The curing agent was added to the propellant mix with agitation to provide uniform dispersion of the agent therethrough. The mix was then cast into a suitable mold and cured at 45° C. for 36 hours. The results are set forth in Table 1. Propellant grains formulated according to this invention have been successfully fired in rocket motors.

As can be seen the curatives of this invention are not only capable of producing all-epoxy cures but are also usable in conjunction with other crosslinking agents. Further, in addition to curing the carboxy-terminated polyisobutylene systems, the curing agents of this invention have also produced cures of other carboxy-terminated polymers including carboxy-terminated polyesters, carboxy-terminated polyethers and carboxy-terminated polymers of conjugated diolefins.

TABLE 1

| Example No. | Component | Equivalents of binder | Percent elongation, 76° F. | Tensile strength, p.s.i., 76° F. | Comments |
|---|---|---|---|---|---|
| 4 | Propellant mix | 1.0 | | | Viscosity of mixture was high but was processable. Satisfactory for mixing and casting of small batches. Cast grain had good mechanical properties. |
|  | ECD | 0.9 | 13.4 | 148 | |
|  | Chain extender [1] | 0.3 | | | |
|  | Catalyst [2] (0.75% by weight of binder). | | | | |
| 5 | Propellant mix | 1.0 | | | Viscosity of mixture was high but was processable. Satisfactory for mixing and casting of small batches. Cast grain had satisfactory mechanical properties. |
|  | EUD | 1.2 | 8.8 | 82 | |
|  | Catalyst (0.75% by weight of binder). | | | | |
| 6 | Propellant mix | 1.0 | | | Viscosity of mixture was sufficiently low as to be suitable for use in large scale mixing operations. Cast grain had very good mechanical properties. |
|  | EHD | 1.2 | 20.0 | 176 | |
|  | Catalyst (0.5% by weight of binder). | | | | |
| 7 | Propellant mix | 1.0 | | | Viscosity of mixture was sufficiently low as to be suitable for use in large scale mixing operations. Cast grain had excellent mechanical properties. |
|  | EHD | 0.325 | 19.0 | 211 | |
|  | MAPO [3] | 0.975 | | | |
|  | Catalyst (0.25% by weight of binder). | | | | |
| 8 | Propellant mix | 1.0 | | | Viscosity of mixture was sufficiently low as to be suitable for use in large scale mixing operations. Cast grain had good mechanical properties. |
|  | EHD | 1.3 | | | |
|  | Catalyst (0.25% by weight of binder). | | | | |
| 9 | Propellant mix | 1.0 | | | Viscosity of mixture was sufficiently low as to be suitable for use in large scale mixing operations. Cast grain had satisfactory mechanical properties. |
|  | EHD | 1.2 | | | |
|  | Catalyst (0.25% by weight of binder). | | | | |

[1] Difunctional epoxide used to improve elongation of cast grain.
[2] Chromium 2-ethylhexanoate.
[3] Tris(2-methylaziridinyl)phosphine oxide.

While this invention has been described with respect to several specific examples it should not be construed as limited thereto. Various modifications can be made without departing from the scope of the invention which is limited only by the following claims.

We claim:
1. A trifunctional epoxy crosslinking agent for crosslinking difunctional carboxyterminated polymers consisting of bis(3,4 epoxycyclohexylmethyl) - 4,5 epoxycyclohexane-1,2-dicarboxylate.
2. A trifunctional epoxy crosslinking agent for crosslinking difunctional carboxyterminated polymers consisting of bis(10,11-epoxyundecyl) - 4,5 - epoxycyclohexane-1,2-dicarboxylate.

References Cited

UNITED STATES PATENTS

| 2,870,170 | 1/1959 | Payne et al. | 260—348 |
| 3,297,725 | 1/1967 | Gundel et al. | 260—348 |
| 2,783,250 | 2/1957 | Payne et al. | 260—348 |
| 2,794,030 | 5/1957 | Phillips et al. | 260—348 |
| 3,142,687 | 7/1964 | Goldsmith et al. | 260—348 |
| 2,963,490 | 12/1960 | Rowland et al. | 260—348 |

FOREIGN PATENTS

| 771,813 | 4/1957 | Great Britain | 260—348 |
| 1,093,363 | 11/1960 | Germany | 260—348 |
| 783,300 | 9/1957 | Great Britain | 260—348 |

NORMAN S. MILESTONE, Primary Examiner

U.S. Cl. X.R.

44—25; 260—468